March 25, 1969 W. W. GIVENS 3,435,217
PRODUCTION OF CHEMISTRY-DEPENDENT GAMMA RAY AND
THERMAL NEUTRON LOGS CORRECTED FOR POROSITY
Filed June 28, 1965 Sheet 1 of 2

WYATT W. GIVENS
INVENTOR

BY Arthur F Zobel
ATTORNEY

# United States Patent Office 3,435,217
Patented Mar. 25, 1969

3,435,217
PRODUCTION OF CHEMISTRY-DEPENDENT
GAMMA RAY AND THERMAL NEUTRON
LOGS CORRECTED FOR POROSITY
Wyatt W. Givens, Dallas, Tex., assignor to Mobil Oil
Corporation, a corporation of New York
Filed June 28, 1965, Ser. No. 467,411
Int. Cl. G01t 1/18; H01j 39/18, 39/30
U.S. Cl. 250—83.1     9 Claims

ABSTRACT OF THE DISCLOSURE

The specification discloses a method and system for producing chemistry-dependent logs corrected for porosity from measured borehole count rates of thermal neutrons, gamma rays, and epithermal neutrons obtained with a thermal neutron detector, a gamma ray detector, and an epithermal neutron detector, all employed in combination with a fast neutron source. In carrying out the process, the observed epithermal neutron count rate is modified to obtain porosity-dependent measurements representative of that component of the measured thermal neutron and gamma ray count rates observed and due primarily to the effect of porosity. The measured thermal neutron and gamma ray count rates are combined with the porosity-dependent measurements to obtain chemistry-dependent thermal neutron and gamma ray measurements corrected for porosity.

---

The present invention relates to a radioactive well logging technique for distinguishing between oil- and salt water-bearing formations and, more particularly, to a logging method for obtaining chemistry-accentuated logs corrected for porosity and normalized to shale.

In the field of radioactive well logging, oil- and salt water-bearing formations are distinguished from each other by producing logs which reflect variations in the formation chemistry (thermal neutron absorbers). In one well-known technique, this is accomplished by producing simultaneously a thermal neutron log and a thermal neutron-capture gamma ray log, the latter of which is made sensitive to the chlorine by appropriate selection of the higher energy gamma rays. If salt water, containing strong neutron absorbers, is present, the gamma ray log is expected to reflect an increase in intensity and the thermal neutron log a decrease in intensity. There are many factors, however, such as porosity variations, which prevent the logs from varying in the expected manner thereby causing the formation chemistry to become obscured.

In accordance with the present invention, there is provided a novel well logging technique for producing sensitive and improved thermal neutron and gamma ray logs properly corrected for porosity and which emphasize the chemistry effect or thermal neutron-absorbing properties of the formations referenced to those of shale. In carrying out the technique of the present invention, a reference shale formation and formations of interest, traversed by a borehole, are irradiated with fast neutrons. Epithermal neutrons, thermal neutrons, and thermal neutron-capture gamma rays from the reference shale formations and from the formations of interest are detected and measured. The thermal neutron and gamma ray measurements obtained are chemistry and porosity dependent while the epithermal neutron measurement obtained is dependent primarily upon porosity, i.e., hydrogen content only. The latter measurement may be employed directly in the field or at a later time to obtain porosity-dependent measurements representative of that component of the thermal neutrons and gamma rays detected and primarily due to the effect of porosity of the formations. The measured thermal neutron and gamma ray count rates obtained in the formations are combined with the porosity-dependent thermal neutron and gamma ray measurements, respectively, to obtain chemistry-dependent thermal neutron and gamma measurements corrected for porosity. The chemistry-dependent measurements obtained in the shale formation are employed as a reference with respect to those obtained in formations of interest to obtain chemistry-dependent thermal neutron and gamma ray measurements referenced to shale.

Shale is employed as a reference since it generally exhibits a high effective porosity as well as a very high chemistry effect. The latter effect has been observed recently and is believed due to the presence in shale of strong neutron absorbers, such as boron. These strong neutron absorbers emit gamma rays below the energy level to which the gamma ray measuring system is adjusted for response. The gamma ray count rate as well as the thermal neutron count rate thus generally will be lowest in shales. By employing shale formations as a reference and properly correcting for porosity, significant and meaningful trace excursions and due only to the chemistry of the formations are expected when the logging tool enters other formations of interest.

In the present technique, the porosity-dependent measurements for correcting for porosity are obtained in a manner which allows maximum chemistry sensitivity to be achieved by the thermal neutron and gamma ray detecting systems. More particularly, prior to logging, the gamma ray and thermal neutron detector systems are adjusted to maximum chemistry sensitivity. With this adjustment, porosity response curves of the thermal neutron, gamma ray, and epithermal neutron detecting systems are then determined experimentally for changes primarily due to changes in porosity. The epithermal neutron measurements obtained during logging are employed in combination with the three porosity response curves to determine that component of the gamma rays and thermal neutrons detected in the formations during logging and due primarily to the porosity thereof.

The present technique thus avoids adjustment of the detector systems to obtain equal responses for a given change in porosity which otherwise would be required for exact porosity correction if the epithermal neutron log alone were employed as a reference. Such adjustment is not desirable since it would reduce the sensitivity of the thermal neutron and gamma ray detector systems to changes in chemistry.

For a more complete understanding of the present invention and for further objects and advantages thereof, reference now may be had to the following description taken in conjunction with the accompanying drawings, wherein.

Figure 1:
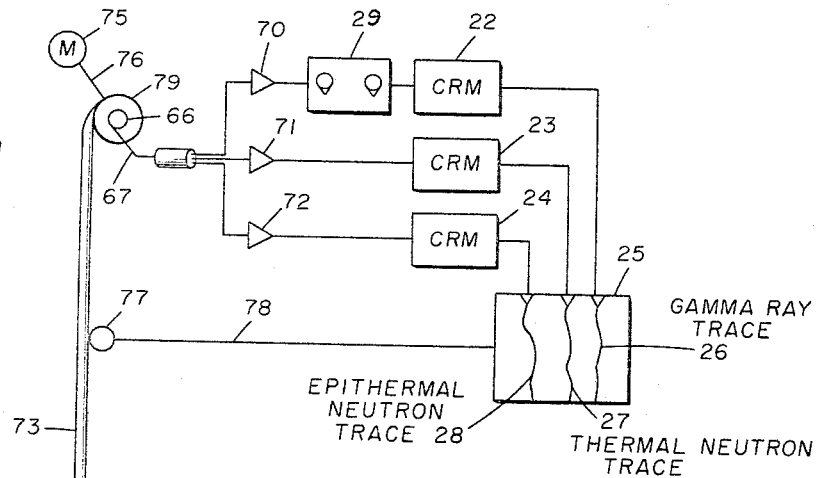
FIGURE 1 illustrates a well logging system employed for carrying out the present invention.

Referring now to FIGURE 1 of the drawings, there will be described the technique and system of the present invention for investigating unknown formations. The formations of interest may be those illustrated at 10–14, traversed by a borehole 15 lined with iron casing 16. The borehole system for obtaining the desired measurements for distinguishing between these formations comprises a borehole tool 17 containing a steady state neutron source 18 for irradiating the formations with fast neutrons. Three detectors 19, 20, and 21 contained in the tool 17 are employed for detecting the resulting thermal neutron-capture gamma rays, thermal neutrons, and epithermal neutrons. The outputs of the three detectors are transmitted to the surface, respectively, to three count rate meters 22, 23, and 24. In one embodiment wherein a graphical technique is employed, the outputs of the three count rate meters are applied to a recording system illustrated at 25 for the recordation, in correlation with depth, of three traces 26, 27, and 28. These traces, respectively, represent the intensity of gamma rays, thermal neutrons, and epithermal neutrons detected within the borehole. The gamma ray and thermal neutron traces 26 and 27 produced are dependent upon both the chemistry effect (strong neutron absorbers) and porosity changes, while the epithermal neutron trace 28 is dependent primarily upon porosity.

Figure 2:
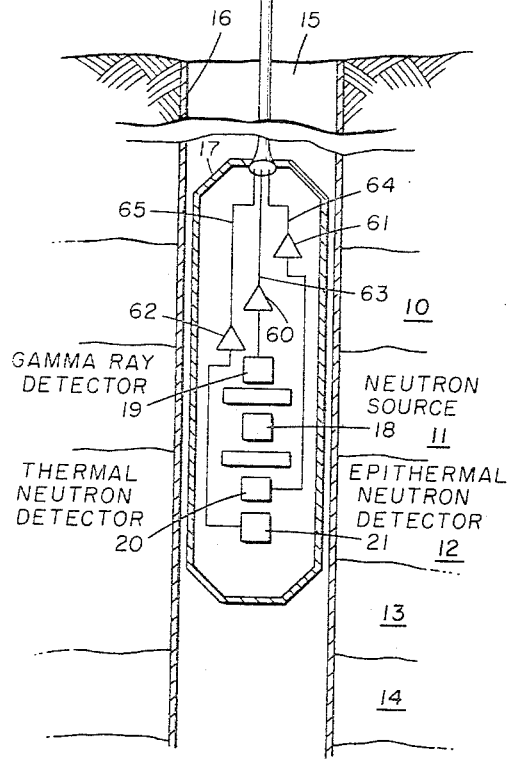
FIGURE 2 illustrates curves useful in understanding the present invention.
Figure 2:
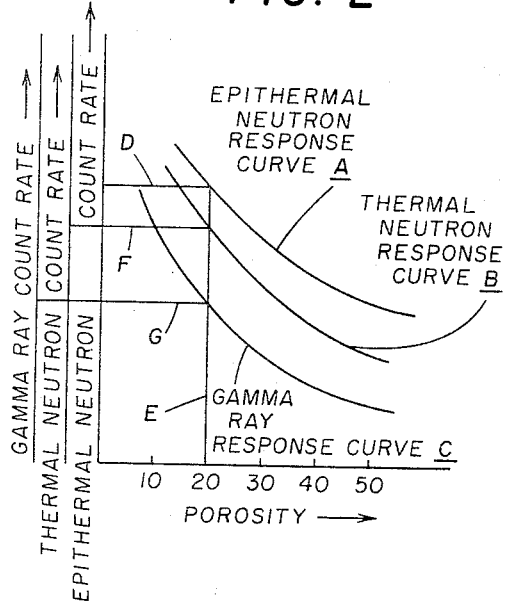

As indicated previously, prior to logging, the gamma ray and thermal neutron detecting systems are adjusted for maximum chemistry sensitivity and porosity response curves A, B, C, illustrated in FIGURE 2, are obtained experimentally for each detector system. During logging, measurements are made within a reference shale formation, illustrated at 10, and other formations of interest 11–14. The epithermal neutron trace 28 obtained during logging is employed, in the graphical technique, in combination with the response curves of FIGURE 2 to determine that portion of the detected gamma rays and thermal neutrons reflected by traces 26 and 27 and due only to porosity. The graphically determined gamma ray and thermal neutron measurements are compared with the observed gamma ray and thermal neutron count rates reflected by traces 26 and 27 to obtain gamma ray and thermal neutron measurements which are dependent only upon changes in the chemistry of the formations. Preferably, reference is made to the shale formation 10 to obtain chemistry-dependent gamma ray and thermal neutron measurements referenced to shale. Analyses of the various measurements give valuable information which is employed to distinguish between the various formations.

A more detailed description of the manner in which the measurements of the present invention are obtained now will be given. As indicated previously, prior to logging the gamma ray and thermal neutron detecting systems are adjusted for maximum sensitivity to changes in formation chemistry. This is accomplished by spacing the thermal neutron and gamma ray detectors relatively far from the source. In addition, the discriminator 29 of the gamma ray system is adjusted for response to the greatest count rate change in going from a shale formation to a salt-water formation. The latter adjustment is carried out by adjusting discriminator 29 for response to gamma rays detected within about 4.6–6.4 mev. The epithermal neutron detector also is spaced away from the source to obtain a maximum sensitivity to changes in porosity.

With the above adjustments, each detector, for a given set of conditions, i.e., borehole diameter, borehole fluid, etc., will reflect a different response for changes in porosity. This can be expressed by the following relationships.

$$N = f_N(\phi) \quad (1)$$
$$n = f_n(\phi) \quad (2)$$
$$\gamma = f_\gamma(\phi) \quad (3)$$

wherein $f_N(\phi)$, $f_n(\phi)$, and $f_\gamma(\phi)$ indicate, respectively, that the epithermal neutron count N, the thermal neutron count $n$, and the gamma ray count $\gamma$, are functions of porosity $\phi$.

The porosity response of each detector system is determined experimentally, prior to logging, by placing the tool 17 in a controlled environment having weak neutron absorbers and wherein a plurality of known porosities are available. Each porosity environment is irradiated with fast neutrons and measurements are carried out within each environment by each detector to obtain the porosity response curves A, B, and C of FIGURE 2.

Having adjusted the gamma ray and thermal neutron detector systems to obtain maximum chemistry sensitivity and having obtained the curves of FIGURE 2, logging operations may then be carried out to obtain the tracts 26, 27, and 28. Within the formations the thermal neutron, gamma ray, and epithermal neutron detector outputs may be expressed generally by the following relationships.

$$n_F = f_n(\phi_F, C_F) \quad (4)$$
$$\gamma_F = f_\gamma(\phi_F, C_F) \quad (5)$$
$$N_F = f_N(\phi_F) \quad (6)$$

wherein expressions (4) and (5) indicate that the thermal neutron and gamma ray count rate in the formations is a function of formation porosity $\phi_F$ and formation chemistry $C_F$, while expression (6) indicates that the epithermal neutron count rate is a function primarily of formation porosity only.

The latter phenomenon is true irrespective of the type formation under investigation.

In the reference shale formation, the thermal neutron and gamma ray count rates become functions of the shale porosity $\phi_S$ and shale chemistry $C_S$ and may be expressed as:

$$n_S = f_n(\phi_S, C_S) \quad (7)$$
$$\gamma_S = f_\gamma(\phi_S, C_S) \quad (8)$$

Similarly, in the formations of interest, the thermal neutron and gamma ray count rates becomes functions of the particular formation porosity $\phi_{F_i}$ and formation chemistry $C_{F_i}$ and are expressed, for purposes of distinction, as:

$$n_{F_i} = f_n(\phi_{F_i}, C_{F_i}) \quad (9)$$
$$\gamma_{F_i} = f_\gamma(\phi_{F_i}, C_{F_i}) \quad (10)$$

Referring to FIGURE 2, there will be described the manner in which the epithermal neutron count rate obtained in the formations and the porosity responses of each detector, determined experimentally, are employed to determine that portion of the gamma ray and thermal neutron detector outputs obtained in the formations which are due only to porosity. More particularly, the measured epithermal neutron count rate reflected by trace 28 and obtained in the formations is applied to the epithermal response curve A of FIGURE 2 to determine the porosity of the formations. This is accomplished by drawing a horizontal line D from the epithermal scale (at a level corresponding to the measured epithermal neutron count rate obtained from trace 28) to the epithermal response curve A and then a vertical line E from the point of interception to the porosity scale. From the points of interception of the vertical E line with the thermal neutron and gamma ray response curves, horizontal lines F and G are extended to the thermal neutron and gamma ray scales. Interception of these horizontal lines with the thermal neutron and gamma scales, respectively, gives that portion of the thermal neutron and gamma ray count rates reflected by traces 27 and 26 and which are due only to porosity. The porosity components of the thermal neutron and gamma ray count rates in the formation may be expressed generally by the following equations:

$$n_F = f_n(\phi_F) \quad (11)$$
$$\gamma_F = f_n(\phi_F) \quad (12)$$

In the shale formations and in the formations of interest, these measurements may be expressed for purposes of distinction as:

$$n_S = f_n(\phi_S) \quad (13)$$
$$\gamma_S = f_\gamma(\phi_S) \quad (14)$$
$$n_{F_i} = f_n(\phi_{F_i}) \quad (15)$$
$$\gamma_{F_i} = f_\gamma(\phi_{F_i}) \quad (16)$$

In carrying out the present invention, chemistry-dependent thermal neutron and gamma ray measurements are obtained by taking the following ratios:

$$f_n(\phi_F, C_F)/f_n(\phi_F) \quad (17)$$
$$f_\gamma(\phi_F, C_F)/f_\gamma(\phi_F) \quad (18)$$

The numerators of these expressions are thermal neutron and gamma ray count rates actually measured while the denominators are graphically determined as described above.

In the shale formation, these ratios become $$f_n(\phi_S, C_S)/f_n(\phi_S) \quad (19)$$
$$f_\gamma(\phi_S, C_S)/f_\gamma(\phi_S) \quad (20)$$

while in the formations of interest the ratios of expressions (17) and (18) become $$f_n(\phi_{F_i}, C_{F_i})/f_n(\phi_{F_i}) \quad (21)$$
$$f_\gamma(\phi_{F_i}, C_{F_i})/f_\gamma(\phi_{F_i}) \quad (22)$$

The chemistry-dependent thermal neutrons and gamma ray measurements obtained are referenced to shale by taking the following ratios:

$$\frac{f_n(\phi_{F_i}, C_{F_i})}{f_n(\phi_{F_i})} \bigg/ \frac{f_n(\phi_S, C_S)}{f_n(\phi_S)} \quad (23)$$

$$\frac{f_\gamma(\phi_{F_i}, C_{F_i})}{(f_\gamma(\phi_{F_i}))} \bigg/ \frac{f_\gamma(\phi_S, C_S)}{f_\gamma(\phi_S)} \quad (24)$$

As indicated previously, the use of shale is preferred as a reference, since it has both a high effective porosity and strong neutron absorbers. Moreover, the characteristics of the shale formations do not vary as much as those of other formations, thereby providing a meaningful reference.

Figure 3:
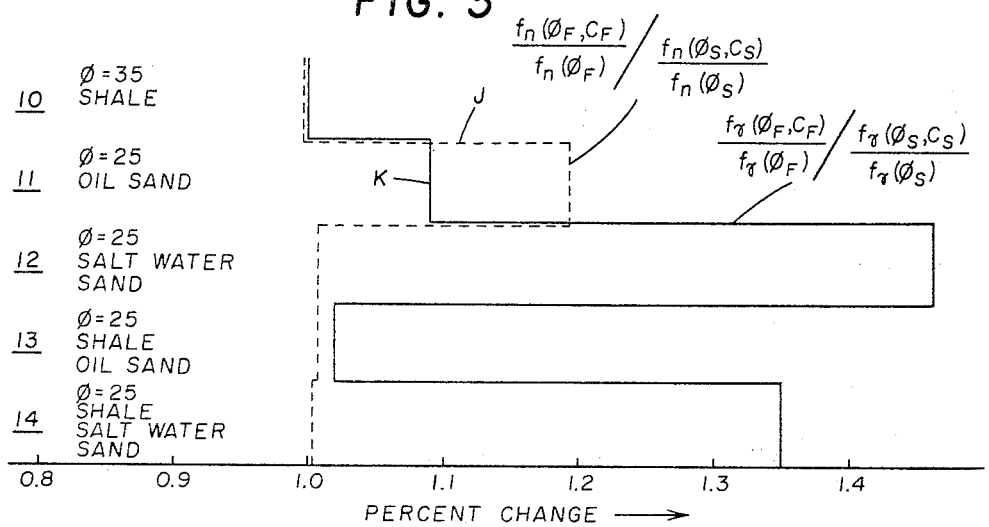
FIGURE 3 illustrates traces useful in understanding the present invention.

The expressions of (23) and (24) may be obtained on a point-by-point basis to produce traces in correlation with depth similar to those shown in FIGURE 3. In FIGURE 3, J is the thermal neutron trace, while K is the gamma ray trace. The formations logged are identified as 10–14, 10 being the reference shale formation. The porosity of this formation is 35% while that of the other formations 11–14 is 25%. As illustrated, the two traces J and K coincide at unity in the shale formation since shale is referenced to itself. In going from the shale formation to other formations, meaningful trace excursions are experienced. More particularly, in the oil sand 11, both the thermal neutron trace and the gamma ray trace reflect an increase since the oil sand 11 exhibits a decrease in thermal neutron absorption properties plus a decrease in effective porosity. The gamma ray trace increases less since the gamma ray detecting system has been selectively adjusted for response to the higher energy gamma rays only. In the salt water sand 12, the increase in chlorine-capture gamma rays and decrease in thermal neutrons are clearly reflected by the two traces.

The logs of the present invention also allow a distinction between oil sands and salt-water sands even though contaminated with shale. For example, formation 13 is an oil sand contaminated with shale. Since this formation contains strong neutron absorbers which produce low energy gamma rays, both the thermal neutrons and gamma ray traces will be at a low level. Their levels will be different from unity, however, and may be greater than unity depending upon the shaliness and porosity of the formation. In formations 12 and 14 the thermal neutron trace also will be low; however, the gamma ray trace will be at a high level thereby allowing distinction from formation 13.

In the interpretation of the traces of FIGURE 3, reference may also be had to chemistry-dependent logs only obtained by recording the results obtained from expressions (17) and (18). Logs of this nature will not be referenced to shale but may provide information useful in the interpretation of the logs of FIGURE 3.

In carrying out the technique of the present invention, the reference shale formation employed, preferably, is one immediately above the zones of particular interest. If such a shale zone is present, there is a good probability that the zones of interest below the shale zone will be contaminated with the same type of shale. If an upper adjacent shale zone is not present, then the best shale present along the borehole will be employed as a reference. These zones may be located from prior logging operations.

Figure 4:
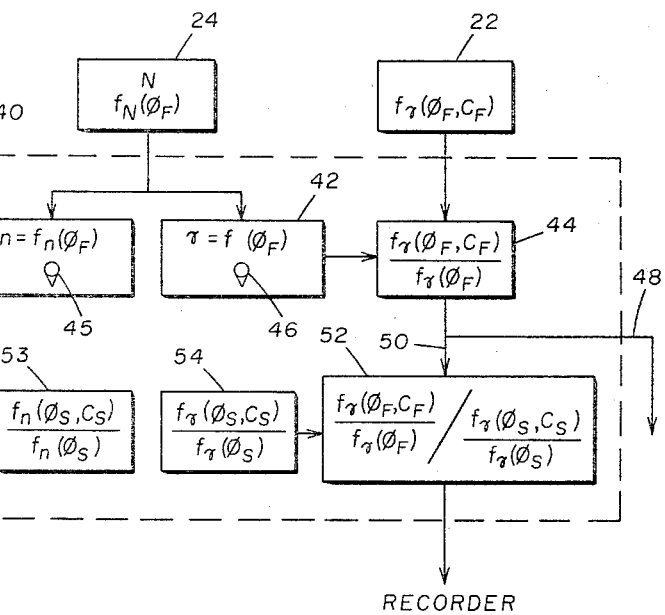
FIGURE 4 illustrates an electronic system for carrying out the present technique.

Referring now to FIGURE 4, there will be described a system for obtaining traces J and K of FIGURE 3 continuously while logging. The outputs of the count meters 22, 23, and 24 are applied to an analog computer, illustrated by dotted line 40. As shown, the output of the epithermal neutron count rate meter 24 is applied directly to diode function generators 41 and 42 while the outputs of the thermal neutron and gamma ray detector count rate meters 22 and 23 are applied, respectively, to ratio-taking devices 43 and 44. The function generators 41 and 42 are programmed to give continuously during logging the same information obtained by expressions (11) and (12) described previously. Programming is carried out prior to logging by inserting the borehole tool 17 in the same controlled formation environment described above having weak neutron absorbers and where different known porosities are available. For each porosity, as reflected by the epithermal neutron detector output, the function generators 41 and 42 are adjusted to produce at their outputs a count rate corresponding to that reflected by the thermal neutron and gamma ray scales of FIGURE 2. More particularly, during programming, the epithermal neutron output is employed in combination with the curves of FIGURE 2 to obtain a porosity reading. For the same porosity, diode function generators 41 and 42 are then adjusted to obtain, at their outputs, the same thermal neutron and gamma ray readings reflected, respectively, by horizontal lines F and G of FIGURE 2. These steps are carried out for a plurality of porosities. Thus, during logging, the function generators 41 and 42 will receive the epithermal neutron count rate obtained and produce at their outputs that component of the thermal neutron and gamma ray detector outputs which are due only to porosity. Adjustment of the diode generators 41 and 42 is carried out by controls illustrated at 45 and 46.

The outputs of diode generators 41 and 42 are applied to ratio-taking devices 43 and 44, respectively. Thus, during logging, devices 43 and 44 produce the same information obtained by expressions (17) and (18) described previously. The outputs of devices 43 and 44 are applied by way of conductors 47 and 48 to suitable recorders and also, by way of conductors 49 and 50, to ratio-taking devices 51 and 52. These devices form the ratio between the outputs of circuits 43 and 44 and the outputs of circuits 53 and 54, the latter of which comprise potentiometers.

In carrying out logging operations, the borehole tool first is inserted into the reference shale formation. In this formation, potentiometers 53 and 54 are adjusted to obtain from ratio-taking devices 51 and 52 outputs representative of unity. With this adjustment, the outputs of devices 51 and 52 will correspond to that represented by expressions (23) and (24) described above and thus will reflect changes in chemistry of the formations referenced to shale. The outputs of devices 51 and 52 are applied to suitable recording means to obtain traces similar to those illustrated at J and K of FIGURE 3.

In one embodiment, the gamma ray detector 19 (FIGURE 1) may be a conventional sodium iodide scintillation crystal coupled to a photomultiplier tube. The thermal neutron detector 20 may be a helium-3 proportional counter at superatmospheric pressure. The detector 19 may comprise the same type of detector covered with a cadmium shield. The outputs of detectors 19, 20, and 21 are amplified, respectively, at 60, 61, and 62 and applied to cable conductors 63, 64, and 65 for transmission to the surface. At the surface, the signals are taken from the conductors by way of slip rings and brushes, illustrated at 66 and 67. These signals are amplified at 70, 71, and 72 before application to the recording instrumentation. The borehole tool 15 is moved through the borehole by cable 73 wound and unwound upon drum 74 driven by motor 75 and mechanical connection 76. The chart of the recording system, illustrated at 25, is driven in correlation with depth by measuring reel 77 and connection 78.

The analog computer 40 may be of the type manufactured by Electronics Associated, Inc., Long Branch, New Jersey, Model No. TR–20. The diode function generators 41 and 42 are identified as Models Nos. 16–308. The ratio-taking devices 43 and 44 are identified as Models Nos. 7–045, while the ratio-taking devices 51 and 52 are identified as Models Nos. 6–712.

Now that the invention has been described, modifications will become apparent to those skilled in the art, and it is intended to cover such modifications as fall within the scope of the appended claims.

What is claimed is:

1. A method of producing radioactive logs of the formations traversed by a borehole comprising the steps of:
   irradiating a reference shale formation and formations of interest traversed by said borehole with fast neutrons,
   detecting epithermal neutrons, thermal neutrons, and thermal neutron-capture gamma rays from said reference shale formation and from said formations of interest,
   producing measurements representative of the intensity of epithermal neutrons, thermal neutrons, and thermal neutron-capture gamma rays detected from said shale formation and from said formations of interest,
   the intensity of said thermal neutrons and gamma rays measured being dependent upon the chemistry and porosity of said formations,
   employing said epithermal neutron intensity measurements to obtain first and second porosity-dependent measurements representative, respectively, of that component of thermal neutrons and gamma rays detected and primarily due to the effective porosity of said shale formation and of said formations of interest,
   combining said chemistry- and porosity-dependent thermal neutron and gamma ray measurements, respectively, with said first and second porosity-dependent measurements to obtain chemistry-dependent thermal neutron and gamma ray measurements corrected for porosity, and
   employing chemistry-dependent thermal neutron and gamma ray measurements obtained in said shale formation as a reference with respect to chemistry-dependent thermal neutron and gamma ray measurements obtained in said formations of interest to obtain chemistry-dependent thermal neutron and gamma ray measurements referenced to said shale formation.

2. The method of claim 1 wherein:
   said chemistry-dependent thermal neutron and gamma ray measurements referenced to shale are obtained by producing functions representative, respectively, of the ratio between said chemistry-dependent thermal neutron and gamma ray measurements obtained in said formations of interest and in said shale formation.

3. The method of claim 1 comprising:
   recording said chemistry-dependent thermal neutron and gamma ray measurements corrected for porosity and said chemistry-dependent thermal neutron and gamma ray measurements corrected for porosity and referenced to said shale formation.

4. A method of producing radioactive well logs employing a source of fast neutrons, a thermal neutron detector, a gamma ray detector, an an epithermal neutron detector comprising the steps of:
   obtaining the porosity response of each detector for changes primarily due to changes in porosity,
   irradiating a reference shale formation and formations of interest traversed by said borehole with fast neutrons,
   detecting thermal neutrons, thermal neutron-capture gamma rays, and epithermal neutrons from said reference shale formation and from said formations of interest,
   producing measurements representative of the intensity of epithermal neutrons, thermal neutrons, and gamma rays detected in said reference shale formation and in said formations of interest,
   said thermal neutron and gamma ray measurements being dependent both upon porosity and the chemistry of said formations,
   said gamma ray measurements being representative of gamma rays detected within an energy range where prominent neutron-capture gamma rays of chlorine exist,
   employing the epithermal neutron measurements obtained from said reference shale formation and from said formations of interest and the porosity response of said three detectors to obtain first and second porosity-dependent measurements representative of that component of thermal neutrons and gamma rays detected and primarily dependent upon the porosity of said shale formation and of said formations of interest,
   combining said chemistry- and porosity-dependent thermal neutron and gamma ray measurements, respectively, with said first and second porosity-dependent measurements to obtain chemistry-dependent thermal neutron and gamma ray measurements corrected for porosity, and
   employing said chemistry-dependent thermal neutron and gamma ray measurements obtained in said shale formations as a reference with respect to said chemistry-dependent thermal neutron and gamma ray measurements obtained in said formations of interest to obtain chemistry-dependent thermal and neutron gamma ray measurements referenced to said shale formation.

5. A method of producing radioactive logs of the formations traversed by a borehole comprising the steps of:
   irradiating a reference shale formation and formations of interest traversed by said borehole with fast neutrons,
   detecting epithermal neutrons, thermal neutrons, and thermal neutron-capture gamma rays from said reference shale formation and from said formations of interest,
   producing measurements representative of the intensity of thermal neutrons and thermal neutron-capture gamma rays detected from said shale formation and from said formations of interest,
   the intensity of said thermal neutrons and gamma rays measured being dependent upon the chemistry and porosity of said formations,
   from the epithermal neutrons detected producing first and second porosity-dependent measurements representative, respectively, of that component of thermal neutrons and gamma rays detected and due predominantly to the effect of porosity,
   combining said chemistry- and porosity-dependent thermal neutron and gamma ray measurements with said first and second porosity-dependent measurements, respectively, to obtain chemistry-dependent and thermal neutron gamma ray measurements corrected for porosity, and
   recording, as a function of depth, the ratio between said chemistry-dependent thermal neutron and gamma ray measurements obtained in said formations of interest and in said shale formation.

6. A method of producing chemistry-dependent logs, corrected for porosity, from borehole measurements of thermal neutrons, thermal neutron-capture gamma rays, and epithermal neutrons obtained with a thermal neutron detector, a gamma ray detector, an epithermal neutron detector, and a fast neutron source located in a borehole tool, comprising the steps of:
   obtaining the porosity responses of said thermal neutron, gamma ray, and epithermal neutron detectors for changes primarily due to changes in porosity, passing said tool through a borehole to irradiate the formations traversed by said borehole with fast neutrons, with said thermal neutron detector, said gamma ray detector, and said epithermal neutron detector, detecting in said borehole the resulting thermal neutrons, thermal neutron-capture gamma rays, and epithermal neutrons, producing separate measurements representative, respectively, of the intensity of thermal neutrons, thermal neutron-capture gamma rays, and epithermal neutrons detected, said thermal neutron and thermal neutron-capture gamma ray measurements obtained being dependent upon the chemistry and porosity of said formations, employing said epithermal neutron measurements to obtain first and second porosity-dependent measurements representative, respectively, of that component of thermal neutrons and gamma rays detected in said borehole and due primarily to the porosity of said formations of interest, said porosity response of said epithermal neutron detector being employed in combination with said porosity responses of said thermal neutron and gamma ray detectors to obtain from said epithermal neutron measurement said first and second porosity-dependent measurements, Combining said chemistry- and porosity-dependent thermal neutron and gamma ray measurements, respectively, with said first and second porosity-dependent measurements to obtain separate chemistry-dependent thermal neutron and gamma ray measurements, corrected for porosity, and recording said separate chemistry-dependent thermal neutron and gamma ray measurements obtained.

7. The method of claim 6 wherein:

the porosity responses of said thermal neutron, gamma ray, and epithermal neutron detectors are obtained prior to logging by placing said tool in a controlled environment having weak neutron absorbers and wherein a plurality of known porosities are available, irradiating said environment with fast neutrons, detecting the resulting thermal neutrons, thermal neutron-capture gamma rays, and epithermal neutrons, and producing measurements representative of the intensity of thermal neutrons, thermal neutron-capture gamma rays, and epithermal neutrons detected in said controlled environment.

8. The method of claim 7 wherein:

said first and second porosity-dependent measurements, for a given formation porosity, correspond with said thermal neutron and gamma ray measurements, respectively, obtained in said environment at the same porosity.

9. A method of producing chemistry-dependent logs, corrected for porosity, from borehole measurements of thermal neutron-capture gamma rays and epithermal neutrons obtained with a gamma ray detector, an epithermal neutron detector, and a fast neutron source located in a borehole tool, comprising the steps of:

obtaining the porosity responses of said gamma ray and epithermal neutron detectors for changes primarily due to changes in porosity, passing said tool through a borehole to irradiate the formations traversed by said borehole with fast neutrons, with said gamma ray detector and said epithermal neutron detector, detecting in said borehole the resulting thermal neutron-capture gamma rays and epithermal neutrons, producing separate measurements respresentative, respectively, of the intensity of thermal neutron-capture gamma rays and epithermal neutrons detected, said gamma ray measurements obtained being dependent upon the chemistry and porosity of said formations, employing said epithermal neutron measurement to obtain a porosity-dependent measurement representative of that component of gamma rays detected in said borehole and due primarily to the porosity of said formation of interest, said porosity response of said epithermal neutron detector being employed in combination with said porosity response of said gamma ray detector to obtain from said epithermal neutron measurement said porosity-dependent measurement, combining said chemistry- and porosity-dependent gamma ray measurement with said porosity-dependent measurement to obtain a chemistry-dependent gamma ray measurement, corrected for porosity, and recording said chemistry-dependent gamma ray measurement obtained.

References Cited

UNITED STATES PATENTS

| | | |
|---|---|---|
| 2,949,535 | 8/1960 | Scherbatskoy. |
| 3,090,867 | 5/1963 | Swanson et al. |
| 3,108,188 | 10/1963 | Dewan et al. _____ 250—71.5 X |
| 3,139,528 | 6/1964 | Johnson _____ 250—83.3 |
| 3,244,882 | 4/1966 | Baldwin et al. _____ 250—83.3 |

OTHER REFERENCES

Rabson, W. R., Chlorine Detection by the Spectral Log, The Petroleum Engineer, March 1959, pp. B102–B107.

Dewan, J. T. et al., Chlorine Logging in Cased Holes, Journal of Petroleum Technology, June 1961, pp. 531–537.

Stroud, S. G., A New Nuclear Log for Determination of Reservoir Salinity, Journal of Petroleum Technology, February 1960, pp. 37–41.

RALPH G. NILSON, *Primary Examiner.*

SAUL ELBAUM, *Assistant Examiner.*

U.S. Cl. X.R.

250—71.5, 83.6

UNITED STATES PATENT OFFICE
CERTIFICATE OF CORRECTION

Patent No. 3,435,217                                                  March 25, 1969

Wyatt W. Givens

It is certified that error appears in the above identified patent and that said Letters Patent are hereby corrected as shown below:

Column 1, line 44, before "chlorine" cancel "the". Column 2, line 6, "gamma measurements" should read -- gamma ray measurements --. Column 4, line 3, "tracts 26" should read -- traces 26 --; line 27, "becomes" should read -- become --; line 58, "formation" should read -- formations --; line 61, Equation (12) should appear as shown below:

$$\gamma_F = f_n(\Phi_F)$$

Column 5, line 22, Equation (24) should appear as shown below:

$$\frac{f_\gamma(\Phi_{F_i}, C_{F_i})}{f_\gamma(\Phi_{F_i})} \Big/ \frac{f_\gamma(\Phi_S, C_S)}{f_\gamma(\Phi_S)}$$

Column 7, line 67, "an an" should read -- and an --. Column 9, line 31, "Combining" should read -- combining --. Column 10, line 25, "formation" should read -- formations --.

Signed and sealed this 31st day of March 1970.

(SEAL)
Attest:

EDWARD M. FLETCHER, JR.                                WILLIAM E. SCHUYLER, Jr.
Attesting Officer                                                Commissioner of Patents